United States Patent
Klimkovich et al.

(10) Patent No.: US 12,421,726 B1
(45) Date of Patent: Sep. 23, 2025

(54) ETHYLENE-PROPYLENE-DIENE TERPOLYMER ("EPDM") ROOF SHINGLES

(71) Applicant: Ignite Labs, LLC, Lake Mary, FL (US)

(72) Inventors: Siarhei Klimkovich, Apopka, FL (US); Scott Stickler, Belle Isle, FL (US); James Douglas Welty, II, Lake Mary, FL (US); Patrick Michael Furlong, Lake Mary, FL (US); Charles Morton Gould, Winter Springs, FL (US); Leman Porter, Maitland, FL (US); David McCall, Sanford, FL (US)

(73) Assignee: Ignite Labs, LLC, Lake Mary, FL (US)

( * ) Notice: Subject to any disclaimer, the term of this patent is extended or adjusted under 35 U.S.C. 154(b) by 0 days.

(21) Appl. No.: 19/066,562

(22) Filed: Feb. 28, 2025

Related U.S. Application Data (63) Continuation of application No. 18/915,617, filed on Oct. 15, 2024.

(51) Int. Cl.
    *E04D 1/28* (2006.01)
    *B29C 43/24* (2006.01)
    (Continued)

(52) U.S. Cl.
    CPC ............... *E04D 1/28* (2013.01); *B29C 43/24* (2013.01); *B29C 43/28* (2013.01);
    (Continued)

(58) Field of Classification Search
    CPC ............ E04D 1/20; B32B 2419/06; Y10T 428/24372; Y10T 428/2438
    See application file for complete search history.

(56) References Cited

U.S. PATENT DOCUMENTS

| | | | | | |
|---|---|---|---|---|---|
| 3,407,556 | A | * | 10/1968 | Leibrook | E04D 1/26 52/559 |
| 4,421,807 | A | * | 12/1983 | Clausing | E04D 5/10 428/354 |

(Continued)

FOREIGN PATENT DOCUMENTS

| CA | 2301420 A1 | 9/2001 |
|---|---|---|
| CA | 2301420 C | 10/2008 |

(Continued)

OTHER PUBLICATIONS

Chotiner, Michael, Roofing with Asphalt Shingles, JLC The Journal of Light Construction, May 21, 2014, https://www.jlconline.com/how-to/roofing/roofing-with-asphalt-shingles_o (Year: 2014).*

(Continued)

*Primary Examiner* — Babajide A Demuren
(74) *Attorney, Agent, or Firm* — Weiss & Arons LLP (57) ABSTRACT

Roof shingles and methods of production thereof are provided. The roof shingles may include ethylene-propylene-diene terpolymer ("EPDM"). The EPDM may include an outward-facing surface and a substrate-facing surface. The outward-facing surface may include a reveal and a conceal. The reveal may be visible when the roof shingle is installed and the conceal may be covered by an upslope adjacent roof shingle when the roof shingle is installed. The roof shingle may include a reinforcement core. The reinforcement core may include galvanized steel. The reinforcement core may be embedded within the EPDM. The roof shingles may include adhesive sealant. The adhesive sealant may be applied to the substrate-facing surface for binding the roof shingle to a downslope adjacent roof shingle or a substrate. The roof shingles may include a plurality of EPDM granules being located on at least a portion of the surface of the reveal.

28 Claims, 5 Drawing Sheets

(51) Int. Cl.
    *B29C 43/28*     (2006.01)
    *B29C 71/00*     (2006.01)
    *B32B 3/04*     (2006.01)
    *B32B 5/16*     (2006.01)
    *B32B 15/085*     (2006.01)
    *B32B 15/18*     (2006.01)
    *B32B 27/14*     (2006.01)
    *B32B 27/32*     (2006.01)
    *E04D 1/26*     (2006.01)
    *E04D 1/30*     (2006.01)
    *B29K 23/00*     (2006.01)
    *B29K 305/12*     (2006.01)
    *B29L 31/10*     (2006.01)
    *E04D 1/00*     (2006.01)

(52) U.S. Cl.
    CPC ............ *B29C 71/0009* (2013.01); *B32B 3/04* (2013.01); *B32B 5/16* (2013.01); *B32B 15/085* (2013.01); *B32B 15/18* (2013.01); *B32B 27/14* (2013.01); *B32B 27/32* (2013.01); *E04D 1/265* (2013.01); *E04D 1/30* (2013.01); *B29K 2023/16* (2013.01); *B29K 2305/12* (2013.01); *B29L 2031/108* (2013.01); *B32B 2260/02* (2013.01); *B32B 2260/046* (2013.01); *B32B 2264/0257* (2013.01); *B32B 2307/7376* (2023.05); *B32B 2419/00* (2013.01); *E04D 2001/005* (2013.01); *E04D 2001/305* (2013.01)

(56) References Cited

U.S. PATENT DOCUMENTS

| | | | | |
|---|---|---|---|---|
| 5,494,729 | A * | 2/1996 | Henry | ............... B32B 7/022 525/122 |
| 5,635,125 | A * | 6/1997 | Ternes | ............... B29C 45/0013 264/328.18 |
| 5,651,837 | A * | 7/1997 | Ohtsuka | ............... H02S 20/23 52/173.3 |
| 6,133,378 | A | 10/2000 | Davis et al. | |
| 7,670,668 | B2 | 3/2010 | Greaves et al. | |
| 8,206,807 | B2 | 6/2012 | Friedman et al. | |
| 8,337,188 | B2 | 12/2012 | MacKinnon et al. | |
| 9,758,970 | B2 * | 9/2017 | Grubka | ............... E04D 1/20 |
| 11,851,553 | B2 | 12/2023 | Papakonstantopoulos et al. | |
| 2001/0022055 | A1 * | 9/2001 | Zhang | ............... E04D 1/20 52/309.1 |
| 2005/0204675 | A1 * | 9/2005 | Snyder | ............... B32B 11/04 52/553 |
| 2012/0124925 | A1 * | 5/2012 | Prinz | ............... E01C 13/045 52/302.1 |
| 2012/0288678 | A1 * | 11/2012 | Grube | ............... B32B 11/10 428/150 |
| 2013/0025224 | A1 * | 1/2013 | Vermilion | ............... E04D 1/20 442/364 |
| 2013/0065020 | A1 * | 3/2013 | Loftus | ............... E04D 5/12 428/143 |
| 2014/0208675 | A1 | 7/2014 | Beerer et al. | |
| 2015/0089892 | A1 * | 4/2015 | Jenkins | ............... E04D 1/26 52/311.2 |
| 2015/0184390 | A1 * | 7/2015 | Loftus | ............... D06N 5/006 428/145 |
| 2015/0291827 | A1 * | 10/2015 | Lee | ............... C09D 133/08 428/141 |
| 2016/0208493 | A1 * | 7/2016 | Horton | ............... E04D 5/145 |
| 2021/0222376 | A1 * | 7/2021 | Seaton | ............... B29C 48/05 |
| 2021/0332591 | A1 * | 10/2021 | Wenstrup | ............... B32B 5/02 |
| 2022/0186499 | A1 * | 6/2022 | Srinivasa | ............... E04D 1/26 |

FOREIGN PATENT DOCUMENTS

| | | | |
|---|---|---|---|
| ES | 2596102 | 1/2017 | |
| ES | 2596102 T3 * | 1/2017 | ............ C08J 3/2053 |
| MX | 293389 B | 1/2012 | |
| WO | WO94/25237 | 11/1994 | |
| WO | WO-9425237 A2 * | 11/1994 | ............... B28B 1/16 |
| WO | WO2001069002 A1 | 9/2001 | |

OTHER PUBLICATIONS

Chotiner, Michael, Roofing with Asphalt Shingles, JLC The Journal of Light Construction, May 21, 2014, https://www.jlconline.com/how-to/roofing-with-asphalt-shingles_o (Year: 2014).

John P. Beaumont, "Runner and Gating Design Handbook: Tools for Successful Injection Molding $2^{nd}$ Edition," Hanser Gardner Publications, 2007.

* cited by examiner

ETHYLENE-PROPYLENE-DIENE TERPOLYMER ("EPDM") ROOF SHINGLES

FIELD OF TECHNOLOGY

Aspects of the disclosure relate to roofing materials. In particular, the disclosure relates to ethylene-propylene-diene terpolymer ("EPDM") roof shingles.

BACKGROUND OF THE DISCLOSURE

For decades, use of asphalt shingles has been widespread in the roofing industry. In the U.S., asphalt shingles were introduced in the early 20th Century. Since then, asphalt shingles have been improved and diversified. Improvements include surface-impregnation with crushed rock granules to add heft (for resistance against impact and against wind-uplift) and to provide traction (for roofer-safety). Diversification has yielded the standard "3-tab" panel and laminated "architectural" asphalt shingles. Those two asphalt tile types were used in ~75% of the five million U.S. roofing jobs of 2023.

That ~25% of U.S. roofing jobs do not currently make use of asphalt shingles points to drawbacks associated with their use, mostly dealing with material durability. Roofs necessarily being exposed to sunshine, the relatively weak resistance of asphalt to degradation by ultra-violet ("UV") radiation represents a serious deficit. UV absorption by the asphalt leads over the years to brittleness and, eventually, to failure of shingle material.

Roofs also absorb sunshine's infra-red ("IR") radiation. IR heating may lead to daytime roof temperatures running ~10°-~25° C. (~50°-~75° F.) higher than ambient air temperatures. That heat may blister asphalt, leading to cracked shingles and, consequently, leaking. Similar damage can come from other heat sources, such as embers from wildfires and even from backyard firepits, igniting burns in the flammable asphalt.

Shingles typically overlie and are nailed to a wood roof. Nails are driven through an upslope "conceal" section of the shingle, so termed because that nail-bearing section is then covered and concealed by a "reveal" section of an adjacent and overlapping upslope shingle. The reveal typically remains uncovered.

The upslope shingle's reveal covers and protects the nail-hole-bearing conceal of the downslope shingle. Usually, in roofing with multi-tab shingle panels, tab alignments are alternated horizontally (i.e., approximately parallel to the plane of the roof) with each course of shingles, with every other course's shingle's tabs vertically aligned. Besides lending the roof a now-traditional aesthetic appeal, such alternation provides additional water-protection by precluding continuous down-streaming along aligned inter-tab spaces.

Nails, wood and asphalt have significantly different coefficients of expansion. Thus, daytime heating and precipitous cooling of the roof, as often accompany summer thunderstorms, may shift shingles' positions relative to each other and relative to the underlying wood, leaving gaps that lead to leaks. Such shifting may occur, but usually on a slower accumulating basis, due to everyday diurnal thermocycling.

Shifting of shingles parallel to and/or away from the plane of the roof substrate upon which they lie, may also contribute to susceptibility of the shingles to wind-uplift and dislodgement. This was seen in the wake of Hurricane Ian's destructive surge through Florida in 2022. Asphalt tiles with claimed ratings of resistance to uplift at winds of up to 130 miles per hour ("mph") experienced catastrophic failure, even in locales that saw diminished Ian inland windspeeds of ~90 mph.

The above deficits of asphalt shingles translate into a limited useful lifetime of 10-20 years for the typical asphalt shingle roof under regular weathering and aging conditions. The lifetime can be extended, under good conditions and with maintenance, to perhaps 25 years. Conversely, severe weathering and aging conditions tend to shorten the lifetime. For instance, many of the wind-uplift failures associated even with Ian's diminished windspeeds of ~90 mph were suffered by roofs notably younger than 10 years. Given asphalt shingle roofs' realistic lifetime limits, insurance companies may "age gate" a typical asphalt shingle roof starting at 15 years and may drop home insurance coverage at that point.

After an asphalt shingle roof's 10-20 year lifetime (or after the roof has sustained irreparable damage, as from hurricanes, wildfires, hailstorms, etc.) and needs to be replaced, there comes into play a further drawback of asphalt shingles associated with their material durability; viz., their being practically nonrecyclable. Asphalt shingles may require several centuries to decompose in landfills, the sites in which most discarded asphalt shingles are disposed.

Estimates of U.S. landfill dumping of asphalt shingles range up to 10 million tons added annually, with over 80% coming from roof removal from existing houses. The bulkiness and incompressibility of the asphalt shingles requires ever increasing and capacious landfill sites. Many such sites are not equipped with barriers for containing potentially carcinogenic compounds that leech from the decomposing petroleum-based asphalt. Even sites built with such containment measures have not proven to adequately protect adjacent aquifers, rivers and soil.

As an alternative to asphalt shingles, sheet metal panels made a mid-to-late 20th century return to popularity in the U.S., but have not achieved the widespread use they enjoyed in the 19$^{th}$ century. Even with metal (such as steel) roofing materials' longer lifetimes (~20-~50 years); better resistance against effects of solar radiation, hurricanes, wildfires, hailstorms, etc.; and high recyclability, all as compared to asphalt shingles, sheet metal roofing currently has only ~10% U.S. market share. Such improvements as using advanced galvanized steel, stone-pressed and corrugated panels, and acrylic overglazing do not seem to have garnered more of the U.S. market share for metal roofing. Some of the reasons for the slow growth of metal roofing popularity are thought to include a sharper rise in metal roofing materials costs over asphalt materials costs; lower plasticity (e.g., incomplete return to flatness after being bent); and higher installation complexity, roofer-safety concerns and labor costs associated with metal roofing materials.

Dupont's 1950s production of weather-resistant rubber-sheet membranes of polymerized ethylene-propylene-diene monomer ("EPDM") provided the roofing industry a material never before available. EPDM is both durable and easily handled in installation, maintenance and post-lifetime recyclability. The polymer's single bonds between its constituent polymethylene monomers lend EPDM resistance to UV radiation that asphalt's substantial number of UV-vulnerable π bonds cannot rival. Similarly, EPDM is highly resistant to chemical oxidation. The dienes of the three-monomer polymer ("terpolymer") are selected to facilitate "vulcanization" reaction-induced cross-linking between multiple linear terpolymer chains, to yield "two-dimensional" networked sheeting of various thicknesses.

EPDM is currently used in a variety of roofing applications. EPDM sheeting is often colored (e.g., black by addition of carbon black; white, by calcium carbonate) and/or surface-impregnated with EPDM granules to achieve the appearance of historically more traditional roofing material.

Current EPDM roofing applications include, notably, flat-roof applications (for, e.g., commercial, industrial, multi-apartment residential buildings). Flat-roof applications have benefited from EPDM's ease of installation and maintenance over such alternatives as bitumen and tar paper, and from EPDM's notable weathering/wear properties.

Usually handled in installations as rolls or sheets, EPDM has also been used successfully in low-slope applications, where roof pitch is below 9.5° from the horizontal (a maximum of approximately one foot of roof rise per six feet of horizontal run).

EPDM membranes are usually affixed to roof surfaces by adhesive and/or specialized clips. Nailing is not a standard affixment option, because nail holes could provide entry to precipitation, and could also provide stress-failure points for further membrane ripping/tearing.

Given the limitations on its affixment, EPDM rolls/sheets are not used in steep-slope applications of roof pitch 9.5° or higher. EPDM roll/sheet material cannot successfully be affixed to or may not remain affixed to a steep-slope roof, failing catastrophically under storm conditions notably less severe than hurricanes.

It would be desirable, therefore, to provide EPDM roofing material operable for use on both low-slope roofs and steep-slope roofs, even under severe weathering/wear conditions.

It would be further desirable to provide EPDM roofing materials that exhibit the structural integrity, high recyclability and long lifetime of metal roofing materials together with the familiar shape/look and ease-of-installation of asphalt shingles, the latter factor inclusive of accommodating nail-affixment and also providing roofer-safety.

SUMMARY OF THE DISCLOSURE

The disclosure provides EPDM roofing material operable for use on steep-slope roofs, even under severe weathering/wear conditions. The EPDM roofing materials provided include EPDM roofing shingles.

The EPDM roofing shingles may exhibit the structural integrity, high recyclability and long lifetime of metal roofing materials together with the familiar shape/look and ease-of-installation of asphalt shingles, well accommodating nail-affixment and providing roofer-safety. To these ends, an EPDM roofing shingle may include a reinforcement core.

As an indicator of advantages of EPDM roof shingles over asphalt shingles, comparison of the different shingles' granular abrasion may be informative. Asphalt shingles exhibit high granule abrasion; that is, large amounts of granules may flake off from, and incrementally degrade the structural integrity of, asphalt shingles due to inclement weather and other natural abrasive erosional and structure-challenging forces. Conversely, EPDM roof shingles exhibit low granule abrasion, with granules not appreciably flaking off (and with shingles remaining robust) even when the EPDM roof shingles are subjected to hail, high winds, heavy rains, sunlight illumination, and other natural abrasive erosional and structure-challenging forces.

BRIEF DESCRIPTION OF THE DRAWINGS

The objects and advantages of the invention may be apparent upon consideration of the following detailed description, taken in conjunction with the accompanying drawings and in which.

DETAILED DESCRIPTION OF THE DISCLOSURE

Roof shingles and methods of production thereof are provided.

The roof shingles may include a "ridge shingle" (also known as a "ridge cap"). The ridge shingle may be configured to be affixed to a roof ridge where two slopes (or facets) of a roof meet in a horizontal configuration. The roof ridge may present along the peak of a sloped roof. The ridge shingle may straddle the ridge. The ridge shingle may be scored to bend across the ridge.

The roof shingles may include a "hip shingle" (also known as a "hip cap"). The hip shingle may be configured to be affixed to a roof geometry where more than two slopes (or facets) of a roof meet in a non-horizontal configuration. The more than two roof slopes (or facets) may meet at the hip of a "hip roof." The hip of a hip roof may present a "hip geometry." The hip shingle may straddle the hip geometry of the hip roof. The hip shingle may conform to the hip geometry of the hip roof.

A term used herein encompassing "hip shingle" and/or "ridge shingle": "hip/ridge single."

The roof shingles may include a shingle that is not a hip/ridge shingle, but rather a "field shingle." The field shingle may be configured to lie flat upon a planar roof section when installed. The field shingle may be configured to lie at least approximately parallel to the planar roof section when installed. The field shingle may typically not be used to span multiple roof slopes (or facets). The field shingle may also be used to span multiple roof slopes (or facets), e.g., in "valley" configurations, where field shingles bridge between facets.

The roof shingles may include EPDM. Such roof shingles may be termed "EPDM roof shingles." An EPDM roof shingle may include EPDM with an ethylene content between about 45 and about 75 mol %. The EPDM roof shingle may include EPDM with a diene content between about 1 and about 12 mol %. Representative dienes that may comprise the EPDM terpolymer include dicyclo-pentadiene and vinyl- and/or ethylidene-norbornene.

The EPDM roof shingle may include EPDM with, e.g., about 60 mol % ethylene, about 38.5 mol % propylene, and about 1.5 mol % diene.

The EPDM roof shingle may possess Shore A hardness (Durometer based on test ASTM D2240) from about 55 to about 75. The EPDM roof shingle may possess water vapor permeance (based on test ASTM E96/E96M) of a minimum of about 8 ng[(Pa)(s)(m$^2$)] (about 0.14 U.S. perm).

The EPDM roof shingles may possess inherent fungal resistance. The EPDM roof shingles may be chemically inherently anti-microbial. For example, after 21 days (based on test ASTM G21), EPDM roof shingles have exhibited no sustained growth or discoloration attributable to microbial growth.

Aerial imagery of EPDM roof shingles may be used to test for discoloration from such microbial infestation as fungal and/or algal growth. Microbial growth may be detected using computer and artificial intelligence ("AI") systems' analysis of digitized aerial roof imagery. Microbial growth may be indicated, for example, by visible (and other bands of) light radiation as streaking on the shingled roof. Aerial imagery of EPDM roof shingles has not evidenced microbial growth.

Aerial imagery may also indicate undulation of roof shingles. Steel roof shingles, for instance, consisting typically of relatively thick steel sheets, can bend from but cannot fully return to their original flat form. Such a lack of plasticity may lead to undulations in a steel roof subjected to sheet-bending forces (severe hail, high windspeeds, etc.).

The EPDM roof shingles, with high plasticity, may not exhibit undulation even after being repeatedly bent and unbent. The EPDM roof shingles may exhibit flexibility. The EPDM roof shingles may be folded. The EPDM roof shingles may be bent. For example, EPDM roof shingles may be bent/unbent up to 100 times in testing without shingle failure.

The reinforcement core may include a metal reinforcement core. The reinforcement core may include a steel core. The reinforcement core may include a galvanized steel core. The reinforcement core may include a sheet-metal reinforcement. The sheet-metal reinforcement may include steel. The steel of the sheet-metal reinforcement may include galvanized steel. The reinforcement core may include a thin metal sheet. The thin metal sheet may include steel. The steel of the thin metal sheet may include galvanized steel. The reinforcement core may include a metal strip. The metal strip may include steel. The steel of the metal strip may include galvanized steel. The reinforcement core may include any other suitable reinforcing material. Other suitable reinforcing material may include a polymeric core. The reinforcement core may not undergo plastic deformation under stress.

The reinforcement core may include 26-gauge to 30-gauge galvanized steel. The reinforcement core may include 28-gauge galvanized steel. Thickness of the 28-gauge galvanized steel may be about 0.02 inch.

The sheet-metal reinforcement may include 28-gauge galvanized steel. The thin metal sheet may include 28-gauge galvanized steel. The metal strip may include 28-gauge galvanized steel.

The reinforcement core may provide rigidity, structural integrity and longevity to the EPDM shingle to carry the EPDM shingle beyond a fifty-year lifespan. Advantages of the reinforcement core including galvanized steel may be strength, rigidity and structural integrity conferred by the galvanized steel toward prevention of wind-uplift; and the galvanized steel providing a durable platform for setting nails and other fasteners onto, into and or through the shingle.

The EPDM roof shingle has been demonstrated in severe-weathering testing to exhibit advanced physical properties of EPDM over other roofing material. These properties may translate directly into roof installations with high resistance to ozone, UV radiation, diurnal (even precipitous) thermo-cycling, wind-uplift and hail impact.

The EPDM may be molded, over-molded, injection-molded, extruded, or molded in any other suitable fashion resulting in the EPDM surrounding the reinforcement core. Other suitable fashion of molding the EPDM about the reinforcement core may include compression-molding. The reinforcement core may be laminated by the EPDM. The reinforcement core may be enclosed within the EPDM. The reinforcement core may be integrated within the EPDM.

The reinforcement core may be embedded within the EPDM. The EPDM may be molded above the reinforcement core. The EPDM may be molded below the reinforcement core. The EPDM may be molded to completely envelop the reinforcement core.

The EPDM may underlie the reinforcement core, presenting, when the EPDM roof shingle is installed, a roof substrate-facing EPDM surface. The EPDM may overlie the reinforcement core, presenting, when the EPDM roof shingle is installed, an outward-facing EPDM surface.

An adhesive sealant may be applied to the substrate-facing surface for binding the EPDM roof shingle to the roof substrate (as for the starter course of shingles). The adhesive sealant may be applied to the substrate-facing surface for adhering the EPDM roof shingle to the outward-facing surface of a downslope adjacent EPDM roof shingle. The adhesive sealant may be activated by heat. The adhesive sealant may be activated by ambient atmosphere. The adhesive sealant may be made active when the EPDM roof shingle is produced. The adhesive sealant may be made active just prior to affixing the EPDM roof shingle.

The substrate-facing surface of the EPDM roof shingle may bear adhesive tabs. The adhesive tabs may lie along the substrate-facing surface of the reveal of the EPDM roof shingle. The adhesive tabs may lie spaced along the substrate-facing surface of the reveal of the EPDM roof shingle. The adhesive tabs may bear the adhesive sealant.

The adhesive sealant may be covered with a removable liner sheet of plastic (e.g., including vinyl, such as PVC, or other suitable contact paper-like material), thereby preventing unintentional contact of the adhesive sealant with another surface. The removable liner sheet of plastic may be configured to be removed just prior to affixment of the EPDM roof shingle, thereby exposing the adhesive sealant to be available for affixment of the EPDM roof shingle to another surface.

The removable sheet plastic may protrude beyond a bottom edge of the reveal's substrate-facing surface of the EPDM roof shingle. The removable sheet plastic may be termed an "adhesive protrusion tab." The adhesive protrusion tab may be configured to be readily observable, even under potentially challenging roofing lighting conditions, to an observer looking down upon the upward-facing surface of the EPDM roof shingle. The adhesive protrusion tab may be brightly colored.

The reinforcement core of the EPDM roof shingle may bear nail-hole location marks indicating locations for driving nails through the conceal of the EPDM roof shingle and into the roof substrate. The reinforcement core of the EPDM roof shingle may include holes configured to accept nails driven through the EPDM of the outward-facing surface of the conceal of the EPDM roof shingle and into the roof substrate. The outward-facing surface of the conceal of the EPDM roof shingle may bear marks configured to indicate nail locations. The marks may be spaced evenly along the reinforcement core in a line paralleling the bottom edge. The holes may be spaced evenly along the reinforcement core in the line paralleling the bottom edge. The marks may be spaced evenly along the outward-facing surface of the conceal of the EPDM roof shingle, in the line paralleling the bottom edge.

The EPDM roof shingles may include a plurality of EPDM granules. The plurality of EPDM granules may be featured on the outward-facing surface of the reveal. The plurality of EPDM granules may be located on at least the portion of the outward-facing surface of the reveal.

The plurality of EPDM granules may be injection-molded into at least the portion of the surface of the reveal. The plurality of EPDM granules may be over-molded onto at least the portion of the surface of the reveal. The plurality of EPDM granules may be adhered to at least the portion of the surface of the reveal.

A portion of the plurality of EPDM granules may be featured on the conceal. The portion of the plurality of EPDM granules may be located on the conceal.

The plurality of EPDM granules may be applied to EPDM roof shingles by use of primer, rubber cement, spray, granule brush, and/or any other suitable bonder, method or applicator. A pre-determined amount of post-application time, such as five minutes or some other suitable time period, may be required to achieve adherence of the plurality of EPDM granules to the EPDM roof shingle.

The plurality of EPDM granules may provide improved traction upon an EPDM roof shingle. The plurality of EPDM granules may provide enhanced friction to facilitate walking on the EPDM roof shingles. Facilitating walking on the EPDM roof shingles may be particularly important on steep-slope roofs.

The EPDM roof shingles may feature different kinds of EPDM granules. Different kinds of EPDM granules may provide different EPDM roof shingle aesthetics. The plurality of EPDM granules may differ in granule color. Color variation of EPDM granules may alter the way ambient light is perceived after the light illumines the EPDM roof shingle. The plurality of EPDM granules of the roof shingle may include, for example, a choice of a variety of different colors of EPDM granules. The plurality of EPDM granules of the roof shingle may include at least one of the variety of different colors of EPDM granules.

The plurality of EPDM granules may differ in granule size. The plurality of EPDM granules may include various sizes of granules. The plurality of EPDM granules may include granules having, for example, a mesh size, sieve size, or diameter from about 0.5-2.5 mm.

A fire rating class of the EPDM roof shingle may be determined by a flame test. The plurality of EPDM granules may have a Class A fire rating. The EPDM may have a Class B fire rating. The EPDM roof shingles may achieve a Class A fire rating because of the Class A fire rating of the plurality of EPDM granules located on the EPDM roof shingles.

EPDM roof shingles may provide for ready deployment of leading-edge interlocks, often useful where a downslope roof shingle interlocks (also adjoins, abuts or overlaps) with an upslope roof shingle. Deploying an EPDM roof shingle interlocks may include using an adhesive sealant to seal the interlock. The adhesive sealant may include EPDM tape. The EPDM tape may be double-sided. The adhesive sealant may include any other suitable means of adherence.

The EPDM roof shingles may be furnished with a wind warranty (yrs) in a range of 10-100 years. The EPDM roof shingles may be furnished with a wind warranty (yrs) of 50 years.

The EPDM roof shingles may be furnished with a wind warranty (mph) in a range of 10-300 mph. The EPDM roof shingles may be furnished with a wind warranty (mph) of 200 mph.

The EPDM roof shingles may achieve a Class A fire rating. The EPDM roof shingles may achieve a hail impact resistance warranty. The EPDM roof shingles may achieve an algae-resistance warranty. The EPDM roof shingles may achieve Florida product approval. The EPDM roof shingles may achieve Miami-Dade product approval. The EPDM roof shingles may achieve high velocity hurricane zone ("HVHZ") approval. The EPDM roof shingles may be priced within a standard consumer price tier. The EPDM roof shingles may provide asphalt shingle aesthetics. The EPDM roof shingles may be sustainable and recyclable.

The EPDM roof shingles may include a mix of different kinds of EPDM granules. EPDM granules may provide different kinds of color for EPDM roof shingle aesthetics. Color variation of EPDM granules may change the way light hits the roof shingle. For example, an EPDM roof shingle may possess a variety of different colors of EPDM granules. The plurality of EPDM granules may include various sizes of granules. For example, the plurality of EPDM granules may have a mesh size, sieve size, or diameter from about 0.5-2.5 mm.

The EPDM roof shingles may be manufactured in various thicknesses. For example, a bottom layer of the EPDM roof shingle may be about $\frac{1}{16}$ inch thick and a top layer of the EPDM roof shingle may be about $\frac{1}{8}$ inch thick. The EPDM may be injection-molded, compression-molded or otherwise produced to achieve the varying degrees of thickness.

The EPDM roof shingles may be manufactured with various EPDM rubber content. The EPDM roof shingles may be manufactured with EPDM rubber of various percentages of ethylene, of propylene and of dienes. The EPDM roof shingles may be manufactured with various EPDM dienes. The EPDM roof shingles may be manufactured with various degrees of vulcanization. The EPDM roof shingles may be manufactured with EPDM containing various content of filler (such as reinforcing and/or colorant fillers). The EPDM roof shingles may be manufactured with EPDM of various degrees of tackiness.

EPDM roof shingle production may be economically efficient. EPDM roof shingle roof-use may be economically efficient. By contrast, other materials for roof shingles, such as silicone and sheet metal, may not be economically efficient in production or roof-use.

The EPDM roof shingles may feature insulative properties. The EPDM roof shingles may provide varying degrees of insulation R-values. The EPDM roof shingles may be certified energy efficient. The EPDM roof shingles may provide a saving in energy efficiency for reduction of air conditioning and/or heating costs. A roof covered in the EPDM roof shingles may provide one or more kilowatt-hour in cost savings per month in heating/cooling costs.

The EPDM roof shingles may provide for basic shingle installation. Basic shingle installation is similar in type and in sequence of activities involved in asphalt shingle roof installation.

EPDM roof shingles may provide vibration-dampening. Vibration-dampening may yield a quieter roof (in comparison, for instance, to an asphalt shingle roof) due to soft/flexible characteristics of EPDM.

Standard commercial solar panels may be installed on the EPDM roof shingles. Solar panels may typically be installed with brackets that pierce underlying roof shingles and affix to underlying wood substrate. An advantage of EPDM roof shingles with respect to solar panels is that the EPDM may close about the piercing, providing protection from water entering the hole cause by the installation bracket.

EPDM roof shingles may be produced by molding, bulk, compression, and/or injection-molding. EPDM sheets may be laminated together to produce EPDM roof shingles.

EPDM roof shingles may be produced by calendering. EPDM roof shingles may include EPDM and reinforcement core material that are calendered together. Two (or more) sheets of EPDM, with a reinforcement core between the sheets, may be fed together into calendering rolls. This process may produce a long run of a "sandwich" sheet of EPDM and reinforcement core materials, an EPDM/reinforcement core sheet. The sandwich sheet may be pressed thin by the calendering rolls.

The EPDM/reinforcement core sheet may be cut to a standard size of an EPDM roof shingle. The calendering rolls may impart a geometric pattern on the reveal of the EPDM roof shingle. The calendering rolls may impart any markings required or desired on the EPDM roof shingle. Such markings may include markings for which printing is not suitable.

EPDM roof shingles and methods of production may include vulcanization for granule application, by which the EPDM dienes form cross-links between EPDM linear polymer sections. EPDM vulcanization may yield enhanced properties such as increased rigidity and durability, and improved mechanical and electrical properties. Vulcanization of EPDM roof shingles may create strong bonds between a substrate and a plurality of granules. Vulcanization may result in a high retention of granules on EPDM roof shingles.

Hips and ridges may be most prone to wind damage because vortices of wind are formed at roof hips and ridges due to differentials in air pressure at those locations. Wind gusts may be concentrated and intense at the hips and ridges. Typically, any roof structure that is not a field shingle has usually been considered a roof accessory, thus leaving hip/ridge shingles to be considered "roof accessories" that have not usually been tested for failure.

Other roof accessories may include flashings, pipes, vents, ridge vents and valley metal. Roof accessories are commonly primary failure points for roofing systems. For example, a low profile flashing may be provided to protect roofs from wind gusts up to 70 mph, while a relatively taller profile flashing may be provided for improved roof water shedding. Failure of these usually incompletely tested roof accessories may jeopardize a roof's integrity.

Hip/ridge EPDM roof shingles may include a smooth piece of molded EPDM. A hip/ridge EPDM roof shingle may include four sides (left, right, reveal, and conceal). The hip/ridge EPDM roof shingle may include a reveal and a conceal. The reveal may be about 6 inches in vertical height (Y). The conceal may be about 6 inches in vertical height (Y). A vertical height (Y) of the conceal and the reveal combined may be about 12.0 inches.

The hip/ridge EPDM roof shingles may each include a conceal including an embedded reinforcement core. The reinforcement core may include a 28-gauge galvanized steel reinforcement core. The full conceal may include the reinforcement core. The reinforcement core may be embedded throughout the entire conceal.

The hip/ridge EPDM roof shingle's reveal may be coated with a plurality of EPDM granules on the reveal's top. The reveal may be coated with EPDM adhesive (or any other suitable sealing agent) on the reveal's bottom.

The hip/ridge EPDM roof shingles may each include a reveal including an adhesive strip. The adhesive strip may be attached to a substrate-facing surface of the full reveal. Upon installation, the reveal may achieve full adhesion to an underlying substrate.

The EPDM roof shingle may be scored linearly along a centerline. The hip/ridge EPDM roof shingles may be scored across a midline for directed bending. The field EPDM roof shingles may be scored across a midline for directed bending.

The hip/ridge EPDM roof shingle may cover the conceals of field shingles of the highest course (ridge course) of field shingles on each slope (or facet) adjoining the ridge. A reveal of the hip/ridge EPDM roof shingle may cover the conceals of the field shingles of the ridge courses adjacent/along and downslope from the ridge. A conceal of the hip/ridge EPDM roof shingle may be covered by a reveal of an adjacent and overlapping hip/ridge EPDM roof shingle affixed along the ridge.

The hip/ridge EPDM roof shingle may include four markings configured to indicate nail locations. The hip/ridge EPDM roof shingle may accept four nails. The hip/ridge EPDM roof shingle conceal may include nail locations on each of its sides (left and right).

The hip/ridge EPDM roof shingles may be configured to be affixed to a roof using two rows of nails. A first row of nails may be deployed in and through a reinforcement core of a hip/ridge EPDM roof shingle conceal. A second row of nails may be deployed in and through a reinforcement core of a hip/ridge EPDM roof shingle conceal.

A first edge of the hip/ridge EPDM roof conceal may be disposed orthogonal the ridge. The first edge of the ridge-spanning hip/ridge EPDM roof conceal may overlap field shingles already installed in ridge courses installed on both roof slopes adjoining the ridge.

The first row of nails may be deployed on both sides of the ridge at, e.g., 0.5 inch-1.0 inch from the first edge of the hip/ridge EPDM roof shingle conceal. The second row of nails may be deployed at, e.g., 0.5 inch-1.0 inch, from a second edge of the hip/ridge EPDM roof shingle conceal. The second edge may be largely parallel to the first edge. The nails may penetrate through upslope sections (near the ridge) of the field shingles of the ridge courses on both side of the ridge.

Alternatively: The first edge of the hip/ridge EPDM roof conceal may be disposed parallel the ridge. The first edge of the hip/ridge EPDM roof conceal may overlap field shingles already installed in a ridge course installed on a first slope adjoining the ridge. The first row of nails may be deployed on the side of the first slope at, e.g., 0.5 inch-1.0 inch from the first edge of the hip/ridge EPDM roof shingle conceal. The first nails (those associated with the first edge) may penetrate through an upslope section (near the ridge) of the field shingles of the ridge course on the first slope. The second row of nails may be deployed at, e.g., 0.5 inch-1.0 inch from an edge of the hip/ridge EPDM roof shingle conceal disposed largely parallel to the first edge and overlapping field shingles already installed in a ridge course installed on a second slope adjoining the ridge. The second nails (those associated with the second edge) may penetrate through an upslope section (near the ridge) of the field shingles of the ridge courses on the second slope.

Upon completion of installation of an EPDM shingle roof, all fasteners and nails on the hip/ridge EPDM roof shingles may be concealed.

The hip/ridge EPDM roof shingle may include a rigid core. The rigid core may be set back 0.1 inch-0.5 inch from an edge of the hip/ridge EPDM roof shingle.

Hip/ridge EPDM roof shingles may be produced by calendering. Hip/ridge EPDM roof shingles may include EPDM and a reinforcement core that are calendered together.

High velocity wind resistance may be a characteristic of EPDM roof shingles. EPDM roof shingles may be certified for high velocity and wind resistance.

Malleability and thickness of the EPDM roof shingles may also be set at manufacture.

The roof shingles may include marks configured for locations of nails. The marks configured for locations of nails may be located on the conceal. The marks configured for locations of nails may include 6 marks. The marks configured for locations of nails may be spaced about 5 inches-7 inches apart from one another.

EPDM roof shingles may be configured to be affixed to a roof using two rows of nails. A first row of nails may be deployed in a reinforcement core of an EPDM roof shingle 0.5 inch-2.0 inches from an edge of the reveal. And a second row of nails may be deployed in the conceal of the EPDM roof shingle 0.5 inch-2.0 inches from an edge of the roof shingle. The second row of nails, in the conceal of the EPDM roof shingle, may come from a first row of nails going through a reinforcement core in an upslope EPDM roof shingle. Upon installation of the roof, all fasteners and nails on the EPDM roof shingles may be concealed.

Adhesive sealant may be deployed about 0.5 inch into the reveal from a leading edge of the EPDM roof shingle. The leading edge of the roof shingle may form one edge of the reveal. The adhesive sealing may be sealed with heat dissipating varnish. The adhesive sealing may seal to prevent water seeping underneath the EPDM roof shingle. The adhesive sealing may help to make the EPDM roof shingle immune to wind-borne debris and seeds implanting in the roof. Further, EPDM rubber is self-sealing, which may further prevent water and moisture ingress.

Physical dimensions of an EPDM roof shingle may include horizontal length (X) along a horizontal axis, vertical height (Y) along a vertical axis, and depth (Z) along a depth axis.

The adhesive sealing may be an EPDM bonding adhesive strip. The EPDM bonding adhesive strip may be about a 1-3-inch range in vertical height (Y). The EPDM bonding adhesive strip may be about 1.5 inches in vertical height (Y). An edge of the EPDM adhesive strip may be located about 6-12 inches away from the reveal.

The reinforcement core may be about 0.01-0.05 inch thick. The reinforcement core may run about 35-40 inches along the horizontal length (X) of the roof shingle.

The surface of the reveal may include geometric tabs. A shapes of the geometric tabs may be, for example, rectangular, pentagonal, trapezoidal, circular, polygonal, or any other suitable shape. The geometric tabs may be configured to alternate with geometric tabs of an upslope adjacent roof shingle. The geometric tabs may be configured to alternate with geometric tabs of a downslope adjacent roof shingle.

The geometric tabs may be configured to be about 4-5 inches in horizontal length (X). The reveal of the roof shingle may be configured to be about 5-7 inches in vertical height (Y).

The EPDM roof shingle may be operable for use on a steep-slope roof. The steep-slope roof may have a pitch of greater than or equal to 2:12 roof pitch. A 2:12 roof pitch indicates an incline or 2 inches for every 12 inches of horizontal span. The steep-slope roof may have a pitch of between 2:12 and 24:12.

The EPDM roof shingle may include a drip edge. "Drip edge" may be a product in the market. A drip edge may be an angled piece (e.g., "L" shaped) of metal flashing installed at an edge of a roof. The EPDM roof shingle may include an adhesive starter strip.

The adhesive starter strip may include EPDM. The adhesive starter strip may include an adhesive backing for adhesion to a standard underlayment and/or drip edge. The adhesive starter strip may be continuous (e.g., a roll of EPDM) or segmented (e.g., individual segments of EPDM) with adhesive backing for either.

The EPDM roof shingle may include EPDM-EPDM bonding for adhesion. The EPDM roof shingle may adhere to an underlayer, e.g., the EPDM roof shingle may bind to bottom layer or substrate. A first row of EPDM roof shingles may fasten through an underlayer into a roof deck.

The EPDM roof shingle may include, in certain embodiments, an adhesive protrusion tab. The hip/ridge shingles may also include, in some embodiments, an adhesive protrusion tab.

The adhesive protrusion tab may be an adhesive contact paper that prevents the adhesive from adhering to other materials until the adhesive contact paper is intentionally removed. The adhesive protrusion tab may be bright in color. The bright color of the adhesive protrusion tab, or absence thereof, may indicate a visual determination that the contact paper has been removed and shingle installation is properly executed. The adhesive itself may terminate just before the leading edge of the shingle. The brightly colored adhesive contact paper, the adhesive protrusion tab, may protrude about 0.25 inch-0.5 inch from a leading edge of the shingle. The adhesive contact paper may be printed with graduated tool cut marks.

The EPDM roof shingle may be operable for use on any building or structure. The EPDM roof shingle may be operable for use, for example, on buildings for golf courses, warehouses, offices, banks, distilleries, carports, retail stores, car washes, car dealerships, car showrooms, garages, car shops, storage facilities, aircraft hangers, commercial, transportation, clinics, cattle barns, hospitals, gyms, schools, education, religious services, sports, including, but not limited to, soccer, indoor hockey, basketball, pickleball, and tennis; on accessory dwelling units; on residential facilities; on facilities for industrial and/or chemical production or storage, for oil/gas, production, for manufacturing, farm storage, self-storage, equestrian use and/or agricultural use.

Methods of producing an EPDM roof shingle are provided. The methods may include molding EPDM above a reinforcement core. The methods may include molding EPDM below a reinforcement core. The methods may include embedding the reinforcement core within EPDM. In some embodiments, methods may include embedding the reinforcement core between layers of EPDM. In some embodiments, the reinforcement core may include a metal core. The metal core may include, for example, galvanized steel.

The methods may include producing an EPDM roof shingle. The EPDM roof shingle may include an outward-facing surface. The EPDM roof shingle may include a substrate-facing surface. The outward-facing surface may include a reveal. The outward-facing surface may include a conceal. The reveal may be visible when the roof shingle is installed. The conceal may be covered by an upslope adjacent roof shingle when the roof shingle is installed.

The methods may include molding a plurality of EPDM granules on at least a portion of a surface of the reveal. The methods may include adhering a plurality of EPDM granules to at least a portion of a surface of the reveal. The plurality of EPDM granules may be located on at least a portion of the surface of the reveal.

The methods may include applying an adhesive sealant to the substrate-facing surface for binding the roof shingle to a downslope adjacent roof shingle or a substrate. The methods may include activating the adhesive sealant by heat. The methods may include activating the adhesive sealant by removing a contact sheet and/or exposing the adhesive to ambient atmosphere. The methods may include providing an adhesive sealant that is already active.

The methods may include producing an EPDM roof shingle that achieves a Class A fire rating. The methods may include producing a plurality of EPDM granules that achieve a Class A fire rating. The methods may include producing an EPDM roof shingle that achieves some or all of a hail impact resistance warranty, an algae-resistance warranty, a Florida product approval or other state product approval, a Miami-Dade approval or other county product approval, a high velocity hurricane zone ("HVHZ") approval, entry into a standard consumer price tier, asphalt shingle aesthetics, high sustainability and high recyclability. The methods may include producing an EPDM roof shingle that allows for basic roof shingle installation as widely practiced in asphalt tile roofing installations.

The methods may include producing an EPDM roof shingle including marks configured for locations of nails. The marks configured for locations of nails may be located on the conceal. The marks configured for locations of nails may include six (6) marks. The marks configured for locations of nails may be spaced about 5-7 inches apart from one another.

The methods may include sealing the adhesive sealant with heat dissipating varnish. The methods may include applying an adhesive sealant up to about 0.5 inch from a leading edge of the roof shingle into the reveal. The leading edge of the roof shingle may constitute one edge of the reveal.

The methods may include producing an EPDM roof shingle with a reinforcement core about 0.01-0.05 inch thick in depth (Z). The methods may include producing a roof shingle with a reinforcement core that runs about 35-40 inches along the horizontal length (X) of the roof shingle.

The methods may include producing an EPDM roof shingle with a reveal including geometric tabs. The geometric tabs may be, for example, rectangular, pentagonal, trapezoidal, circular, polygonal, or other relevant geometrical shape. The geometric tabs may be configured to alternate with geometric tabs of an upslope adjacent roof shingle. The geometric tabs may be configured to alternate with geometric tabs of a downslope adjacent roof shingle. The geometric tabs may be configured to be about 4-5 inches in horizontal length (X).

The methods may include producing an EPDM roof shingle with a reveal configured to be about 5-7 inches in vertical height (Y). The methods may include producing an EPDM roof shingle operable for use on a steep-slope roof. The steep-slope roof may have a pitch of greater than or equal to 2:12 roof pitch. A 2:12 roof pitch indicates an incline or 2 inches for every 12 inches of horizontal span.

The methods may include producing a roof shingle with EPDM rubber and a reinforcement core for fastener retention. The reinforcement core may include a metal core. The metal core may include galvanized steel. The metal core may be, for example, a 28-gauge galvanized steel core.

An adhesive may be used to apply the plurality of EPDM granules to at least a portion of the surface of the reveal. In some embodiments, an adhesive may first be applied to a portion of the surface of the reveal. Then the plurality of EPDM granules may be applied to the adhesive on the portion of the surface of the reveal. In other embodiments, the adhesive may first be applied to the plurality of EPDM granules. For example, the adhesive may coat the plurality of EPDM granules. Then the plurality of adhesive-coated EPDM granules may be applied to an adhesive-coated portion of the surface of the reveal.

EPDM roof shingles may include butyl adhesive sealants. Butyl adhesive sealants may include, for example, butyl rubber, butylene, and polyisobutylene.

The EPDM granules may be fire resistant. The EPDM granules may confer fire resistance to the roof shingles.

The roof shingle may include pure EPDM. Pure EPDM may be greater than 99% EPDM by weight. EPDM may be chemically bonded to itself. The roof shingle may include other materials, including other polymers, rubbers, recycled tires, synthetic materials, and thermoplastics. The roof shingle may include any suitable percentage of EPDM.

The methods may include molding EPDM roof shingles. Molding EPDM roof shingles may reproduce shapes and sizes of traditional asphalt shingles. Molding EPDM shingles may reproduce colors that are the same as, or similar to, colors that are currently in use on existing asphalt roof shingles.

The roof shingles may provide fire-spread resistance. The roof shingles may include shingle accessories, for example, flashings. Flashings may keep water out of the roof. Flashings may provide a secondary water barrier. The roof shingles may include accessories for plumbing stacks.

EPDM roof shingles may include a plywood truss configuration. The plywood truss configuration may include plywood on an underlayer beneath at least part of a first course (a starter course) of EPDM roof shingles. The plywood may be about ⅝-¾-inch thick. The EPDM roof shingle may include peel and stick material for adhesion. The EPDM roof shingle may exhibit full adhesion and self-healing.

The EPDM roof shingles may prevent ice damming. The EPDM roof shingles may prevent ice damming by shedding water effectively, since effective water shedding may help reduce the amount of moisture that sits on the roof and contributes to ice damming.

Roof shingles may be installed with proper overlap. Proper overlap may ensure the roof shingles are well-sealed. Proper overlap may help prevent water from getting under the roof shingles, which can contribute to ice dam issues. The roof shingles may be configured to be operable in cold weather climates.

The roof shingles may be operable for ease of transportation and manipulation. The roof shingles may be operable for skylights.

Fasteners penetrating a reinforcement core of an upslope roof shingle may also penetrate a conceal of a downslope roof shingle. Such a configuration including two rows of fasteners—one through the reinforcement core and one through the conceal—for each installed EPDM roof shingle may provide additional integrity and rigidity to the EPDM roof shingles when installed.

The adhesive sealant may be about 1-5 inches in vertical height (along the Y axis). The adhesive sealant may be about 3 inches in vertical height (Y). The adhesive sealant may be activated for EPDM lamination.

The roof shingles may include a chemically welded seam. The roof shingles may provide ease of installation. Ease of installation may include, for example, nailing the roof shingle to a substrate, peeling off wax coated paper revealing the adhesive sealant, and activating the adhesive sealant.

The EPDM roof shingles may be removed and/or uninstalled from a substrate. A challenge to uninstalling EPDM roof shingles may be ring-shank nails. Ring-shank nails may present greater retraction resistance than smooth-shank nails. A challenge to uninstalling EPDM roof shingles may be presented by a sealant strip at the leading edge of the EPDM roof shingles that may be bonded to an underlayment/drip edge flashing.

When large numbers of EPDM roof shingles are dislodged or irreparably damaged, the rest of the roof's EPDM roof shingles may need to be removed/uninstalled. This occurs because EPDM roof shingles include reinforcement core strips and may be bonded together with sealant. With the sealant bonding adjacent EPDM roof shingles, the roof may behave as a "monolithic" single system of EPDM roof shingles Installation of EPDM roof shingles upon a standard roof may take up to about eight hours or more. Removal and/or uninstallation, however, of those shingles may be much more efficient and less time-consuming if the shingles behave as a single system. Such removal and/or uninstallation may take as little as about 20 minutes. In some embodiments, removal and/or uninstallation of EPDM roof shingles may only require pedestrian hand tools available to non-professionals.

Any single EPDM roof shingle may be replaced and/or uninstalled on a roof. For example, an entire roof may not need to be replaced if one or more EPDM roof shingles become broken, defective, or dislodged.

The plurality of EPDM granules may be applied after the EPDM molding. The plurality of EPDM granules may be applied during the EPDM molding.

The plurality of EPDM granules may be provided upslope up to about 1 inch of the reveal. The plurality of EPDM granules may be provided upslope from the leading edge to prevent EPDM granules from "walking" downslope.

The plurality of EPDM granules may include a clay appearance. The plurality of EPDM granules may include pulverized clay. The plurality of EPDM granules may provide aesthetic texture to the EPDM roof shingle in a variety of colors and configurations. The plurality of EPDM granules may have colors that are identified using AI.

The EPDM roof shingles may accommodate solar panel configurations. The EPDM roof shingles may accommodate roof-mounted accessories. The roof-mounted accessories may include configurations identical to those accommodated by asphalt roof shingles.

The EPDM roof shingles may achieve wind uplift resistance. The EPDM roof shingles according to the embodiments were subjected to a wind/wind-driven rain test (see more detail below). The EPDM roof shingles passed the wind/wind-driven rain test with wind gusts up to at least 110 mph. The wind/wind-driven rain test was the TAS 100 test. (See https://www.intertek.com/building/standards/tas-100/.) The TAS 100 test is a standard test method for wind and wind driven rain resistance of discontinuous roof systems.

The TAS 100 procedure may provide a means for establishing discontinuous roof system resistance to wind-driven rain. A discontinuous roof system may include, for example, an underlayment and a prepared roof covering. Discontinuous roof systems may be, e.g., metal roof panels, metal shingles, asphalt shingles, EPDM roof shingles, and composite shingles.

The TAS 100 procedure includes spraying water on a specimen using a water spray rack. The water is sprayed at a rate of 8.8 inches of rainwater volume during each active spray interval. A wind generator is then used to generate wind speeds of 35 mph, 70 mph, 90 mph, and 110 mph for specified intervals with 10-minute periods of rest after each interval.

The TAS 100 test may verify whether the roof shingle system provides sufficient wind-driven rain resistance such that water does not permeate the roof deck sheathing. A comprehensive test report may be issued at the conclusion of the TAS 100 test. The TAS 100 test deck may incorporate eave, valley, and rake conditions. (An "eave" may include horizontal roof overhangs located at the bottom edge of a roof section. A "rake" may include sloped sections of overhangs that extend from eaves to a roof peak. A roof "valley" may include a location where two roof facets meet at a slope to form an interior angle.)

Corner and perimeter spacing may also be used for clips and fasteners, however, they may not be used for field spacing.

An exemplary embodiment of EPDM roof shingles was exposed to the TAS 100 test with the following conditions. First, the EPDM roof shingles were exposed to 8.8 inches of rainwater volume at 35 mph wind speeds for 15 minutes, followed by a 10-minute rest. Second, the EPDM roof shingles were exposed to 8.8 inches of rainwater volume at 70 mph wind speeds for 15 minutes, followed by a 10-minute rest. Third, the EPDM roof shingles were exposed to 8.8 inches of rainwater volume at 90 mph wind speeds for 15 minutes, followed by a 10-minute rest. Fourth, the EPDM roof shingles were exposed to 8.8 inches of rainwater volume at 110 mph wind speeds for 5 minutes. Finally, the TAS 100 test concluded showing the exemplary embodiment of EPDM roof shingles intact and undamaged.

Charts 1-3 illustrate data comparing an EPDM roof shingle as described herein ("EPDM Roof Shingle") to other/competitor products including GAF's Timberline HDZ®, Owen Corning's Duration® Series, CertainTeed's Landmark® PRO, Tilcor's CF Shingle, F-Wave's Revia®, GEM's Euroshield, and Tamko's Proline® Titan XTR.

Chart 1 (Part A) illustrates data comparing the EPDM Roof Shingle to other/competitor products with respect to discontinuous system material, leading edge interlock, wind warranty (yrs), and wind warranty (mph).

CHART 1

EPDM Roof Shingle vs. Competitor Products (Part A)

| Name | Product | Discontinuous System Material | Leading Edge Interlock | Wind Warranty (yrs) | Wind Warranty (mph) |
|---|---|---|---|---|---|
| EPDM Roof Shingle* | Shingle | Galv. Metal Core EPDM | EPDM Tape | 50 | 200** |
| GAF | Timberline HDZ® | Asphalt | Tar | 15 | 130 |
| Owens Corning | Duration® Series | Asphalt | Tar | 15 | 130 |
| CertainTeed | Landmark® PRO | Asphalt | Tar | 15 | 130 |
| Tilcor | CF Shingle | Galvanized Metal | Mechanical | 50 | N/A |

CHART 1-continued

EPDM Roof Shingle vs. Competitor Products (Part A)

| Name | Product | Discontinuous System Material | Leading Edge Interlock | Wind Warranty (yrs) | Wind Warranty (mph) |
|---|---|---|---|---|---|
| F-Wave | Revia ® | Synthetic Polymer | Chemical | 15 | 130 |
| GEM | Euroshield | Synthetic Polymer | Mechanical | 50 | 90 |
| Tamko | Proline ® Titan XT ® | Asphalt | Chemical | 15 | 160 |

*As described herein
**Until deck failure

Chart 2 (Part B) illustrates data comparing the EPDM Roof Shingle to the other/competitor products with respect to wind speed class (mph), Class A fire rating, hail impact resistance, algae-resistance warranty, Florida product approval, and Miami-Dade product approval.

CHART 12

EPDM Roof Shingle vs. Competitor Products (Part B)

| Name | Wind Speed Class (mph) | Class A Fire Rating | Hail Impact Resistance | Algae-Resistance Warranty | Florida Product Approval | Miami-Dade Product Approval |
|---|---|---|---|---|---|---|
| EPDM Roof Shingle* | 151-190 | Yes | Yes | Yes | Yes | Yes |
| GAF | 151-190 | Yes | No | Yes | Yes | Yes |
| Owens Corning | 151-190 | Yes | No | Yes | Yes | Yes |
| Certain-Teed | 151-190 | Yes | No | Yes | Yes | Yes |
| Tilcor | N/A | Yes | No | No | Yes | Yes |
| F-Wave | 151-190 | Yes | Yes | Yes | Yes | No |
| GEM | 90 | No | Yes | No | No | No |
| Tamko | 151-190 | Yes | No | Yes | Yes | Yes |

*As described herein

Chart 3 (Part C) illustrates data comparing the EPDM Roof Shingle to the other/competitor products with respect to high velocity hurricane zone ("HVHZ") zone approved, consumer price tier, basic shingle installation, asphalt shingle aesthetics, and sustainable and recyclable.

CHART 3

EPDM Roof Shingle vs. Competitor Products (Part C)

| Name | HVHZ Zone Approved | Consumer Price Tier | Basic Shingle Installation | Asphalt Shingle Aesthetics | Sustainable and Recyclable |
|---|---|---|---|---|---|
| EPDM Roof Shingle* | Yes | Standard | Yes | Yes | Yes |
| GAF | No | Standard | Yes & No | Yes | No |
| Owens Corning | No | Standard | Yes | Yes | No |
| CertainTeed | No | Standard | Yes | Yes | No |
| Tilcor | Yes | High | No | No | Yes |
| F-Wave | Yes | Medium | Yes | No | Yes |
| GEM | No | Standard | Yes | No | Yes |
| Tamko | No | Standard | Yes & No | Yes | No |

*As described herein

Roof shingles and methods described herein are illustrative. Roof shingles and methods in accordance with this disclosure may now be described in connection with the figures, which form a part hereof. The figures show illustrative features of roof shingles and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Roof shingles may omit features shown or described in connection with illustrative roof shingles. Embodiments may include features that are neither shown nor described in connection with the illustrative roof shingles. Features of illustrative roof shingles may be combined. For example, an illustrative embodiment may include features shown in connection with another illustrative embodiment.

Figure 1:
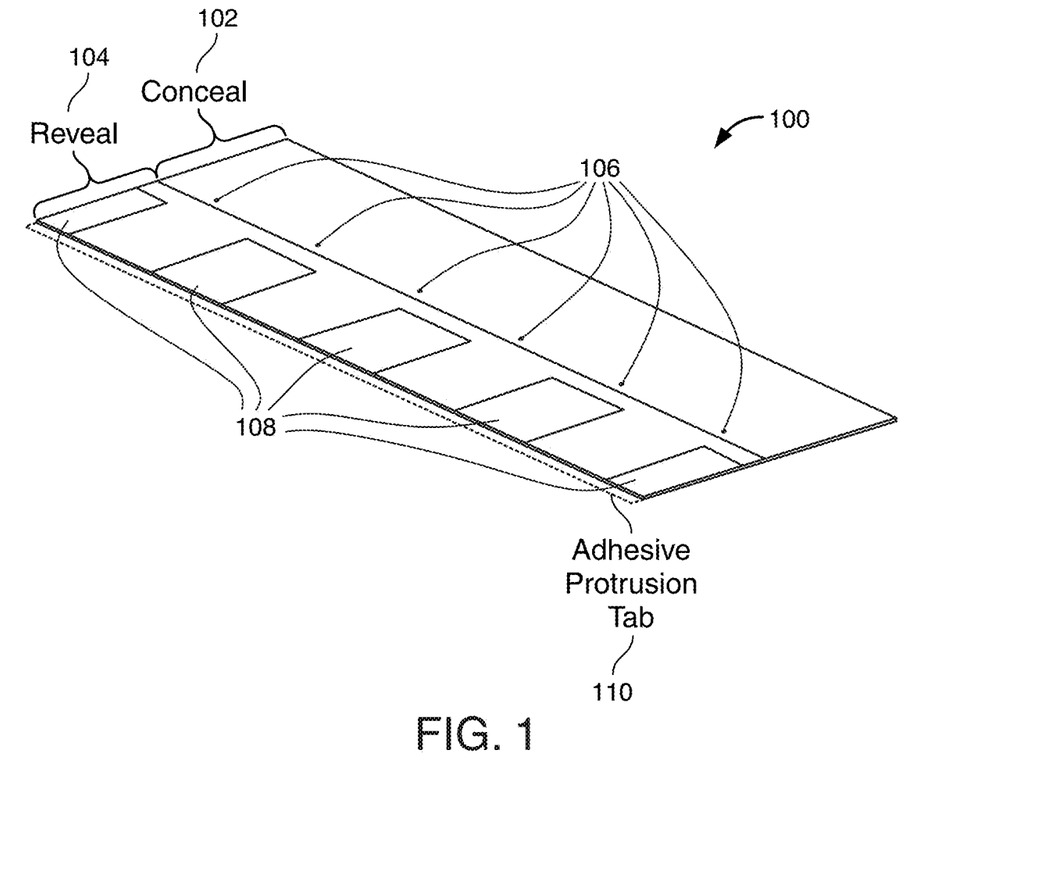
FIG. 1 shows an illustrative diagram in accordance with principles of the disclosure.

FIG. 1 shows roof shingle 100. Roof shingle 100 may include a conceal 102. Roof shingle 100 may include a reveal 104. Reveal 104 may remain visible after roof shingle 100 is installed. Conceal 102 may be covered, after roof shingle 100 is installed, by an upslope adjacent and overlapping roof shingle.

Conceal 102 may include marks 106. Marks 106 may be configured for indication of locations of nails. Reveal 104 may include geometric tabs 108. An adhesive protrusion tab 110 may protrude about 0.25 inch-0.5 inch from a leading edge of reveal 104.

Figure 2:
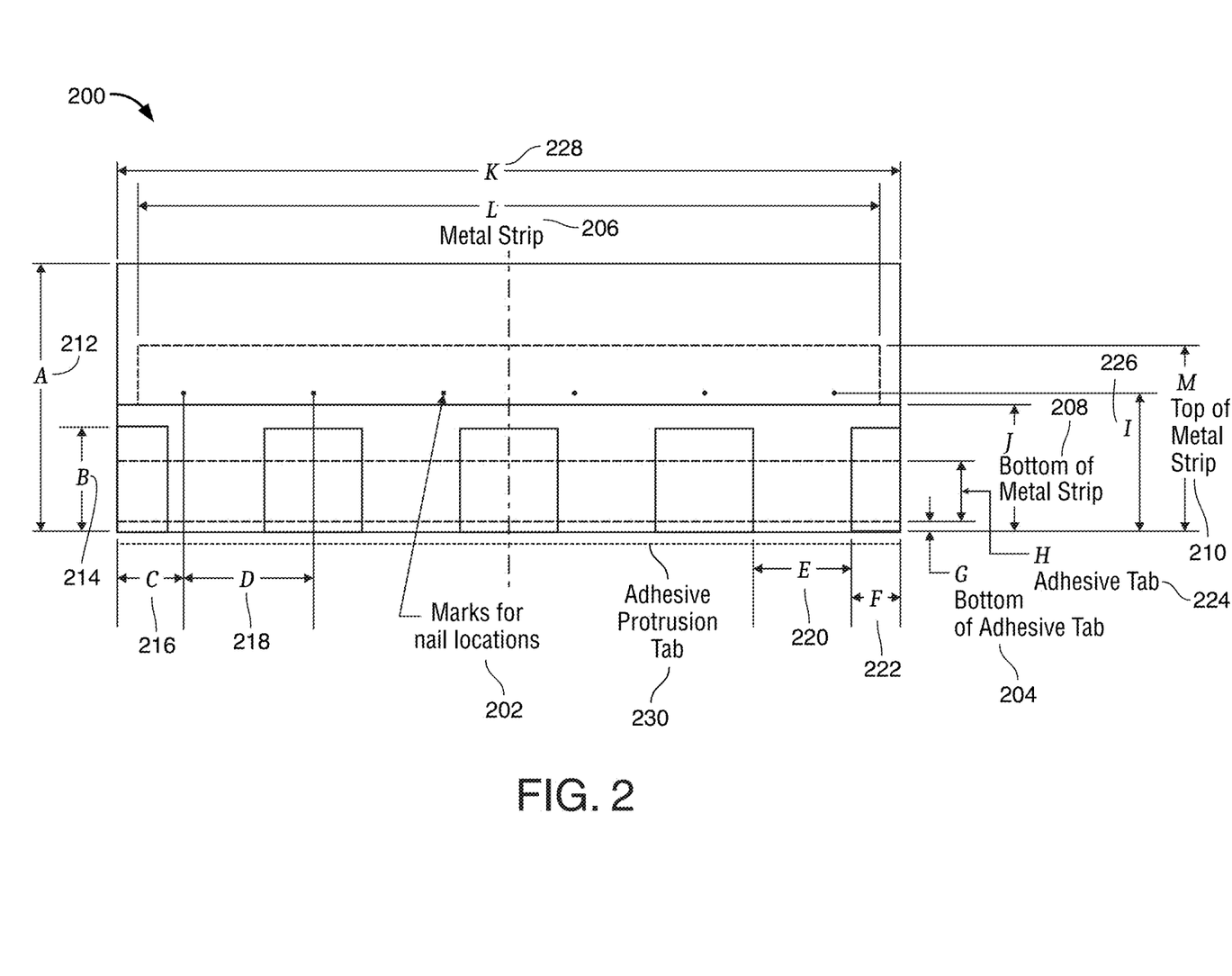
FIG. 2 shows another illustrative diagram in accordance with principles of the disclosure.

FIG. 2 shows roof shingle 200. Roof shingle 200 may include marks 202 configured to indicate nail locations. Marks 202 for nail locations may be disposed distance D from one another. Roof shingle 200 may include a bottom 204 of adhesive tab 224.

Roof shingle 200 may include metal strip 206 as its reinforcement core. Metal strip 206 may include bottom 208. Metal strip 206 may include top 210.

Roof shingle 200 may be characterized, in part, by the following dimensions, locations, and/or features:

A 212—extension of roof tile 200 in "height," i.e., orthogonal to a leading edge of roof shingle 200 (the leading edge depicted as a bottom edge of FIG. 2's depicted shingle);

B 214—extension of adhesive tab 224 in "height" from (in direction orthogonal to) the leading edge;

C 216—distance between a side edge (a side orthogonal to the leading edge) of roof shingle 202 and a mark 202 nearest the side edge;

D 218—distance between adjacent marks 202;

E 220—distance between facing edges of geometric accent configurations;

F 222—extension from a side edge of roof tile 200 (and parallel to the leading edge) of a geometric accent configuration with a side coextensive with the side edge;

G—bottom 204 of adhesive tab 224;

H—adhesive tab 224;

I 226—distance of marks 202 from the leading edge;

J—bottom 208 of metal strip 206;

K 228—extension of roof tile 200 in "width" (orthogonal to "length" direction A);

L—metal strip 206; and

M—top 210 of metal strip 206.

Approximate values associated with the dimensions, locations, and/or features shown—in illustrative roof shingle 200 may be:

A 212—13.25 inches;

B 214—5.12 inches;

C 216—3.25 inches;

D 218—6.50 inches;

E 220—4.88 inches;

F 222—2.44 inches;

G 204—up to 0.5 inches from the leading (for instance, about 0.125 inches from the leading edge);

H 224—may extend "vertically" about 3.00 inches from G;

I 226—6.88 inches;

J 208—6.25 inches;

K 228—39.00 inches;

L 206—may extend "horizontally" about 37.00 inches; and

M 210—9.25 inches from the leading edge.

Adhesive protrusion tab 230 may protrude beyond the leading edge. Adhesive protrusion tab 230 may protrude about 0.25-0.5 inch from the leading edge. Adhesive protrusion tab 230 may include a brightly colored piece of contact paper (or other readily removable covering material, such as waxed paper) adhering to a back surface of adhesive tabs 224. Adhesive protrusion tab 230 may be removed exposing the substrate-facing adhesive portion of adhesive tabs 224 in preparation for affixment of roof shingle 200.

Figure 3:
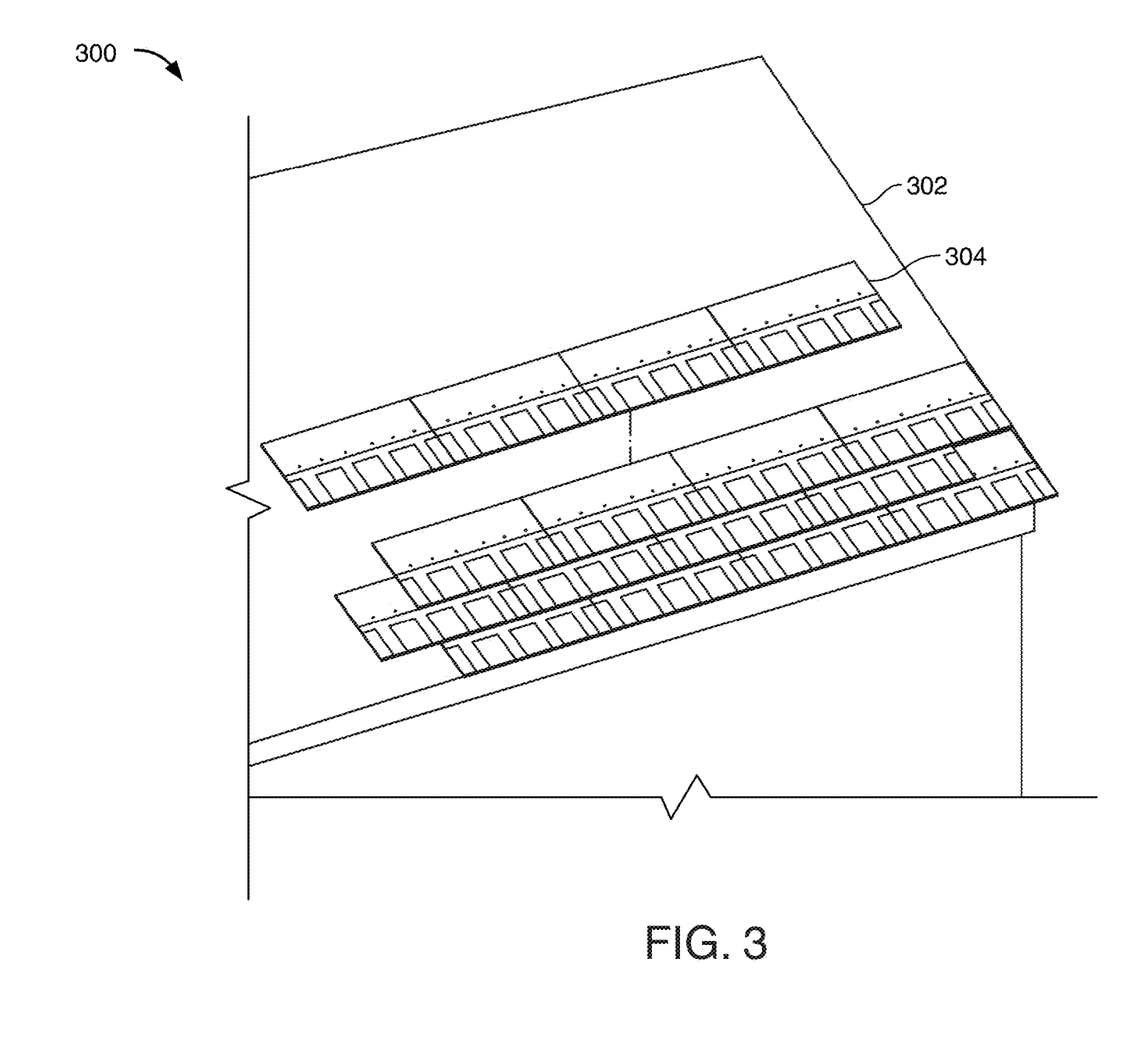
FIG. 3 shows an illustrative diagram of roof shingles in accordance with the disclosure.

FIG. 3 shows roof configuration 300 according to the disclosure. Roof shingles 304 may be installed on roof 302. As shown in FIG. 3, horizontal placement upon roof 302 of courses of roof shingles 304 may be alternately offset.

Figure 4:
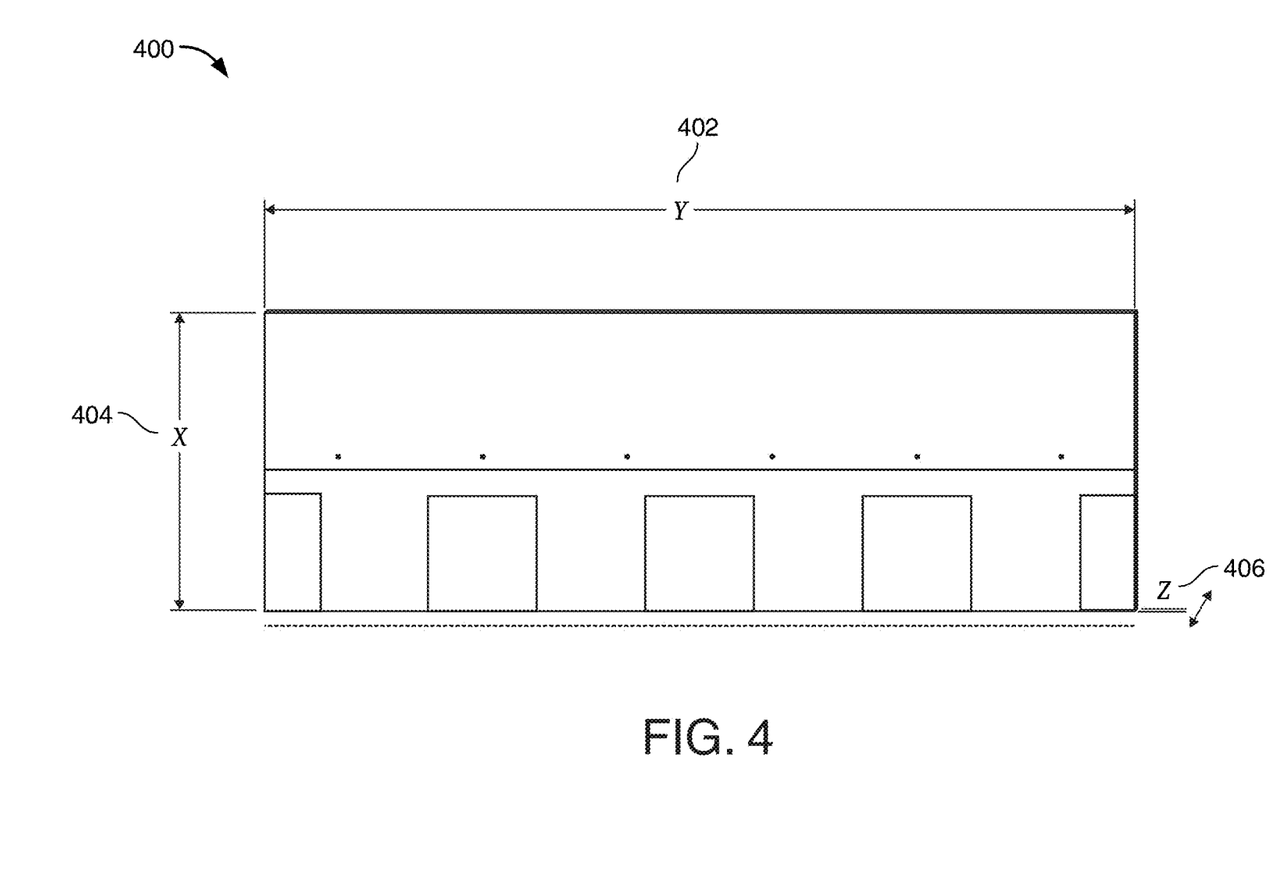
FIG. 4 shows an illustrative diagram of a roof shingle in accordance with the disclosure.

FIG. 4 shows roof shingle 400. A first extent of shingle 400 may be provided by distance (X) 404. A second extent, orthogonal to the first extent, of shingle 400 may be provided by distance (Y) 402. A thickness (or depth) of roof shingle 400 may be provided by distance (Z) 406. A forward edge of an adhesive protrusion tab (protruding from a leading edge shingle 400) may be depicted by a dashed line parallel to the leading edge.

Figure 5:
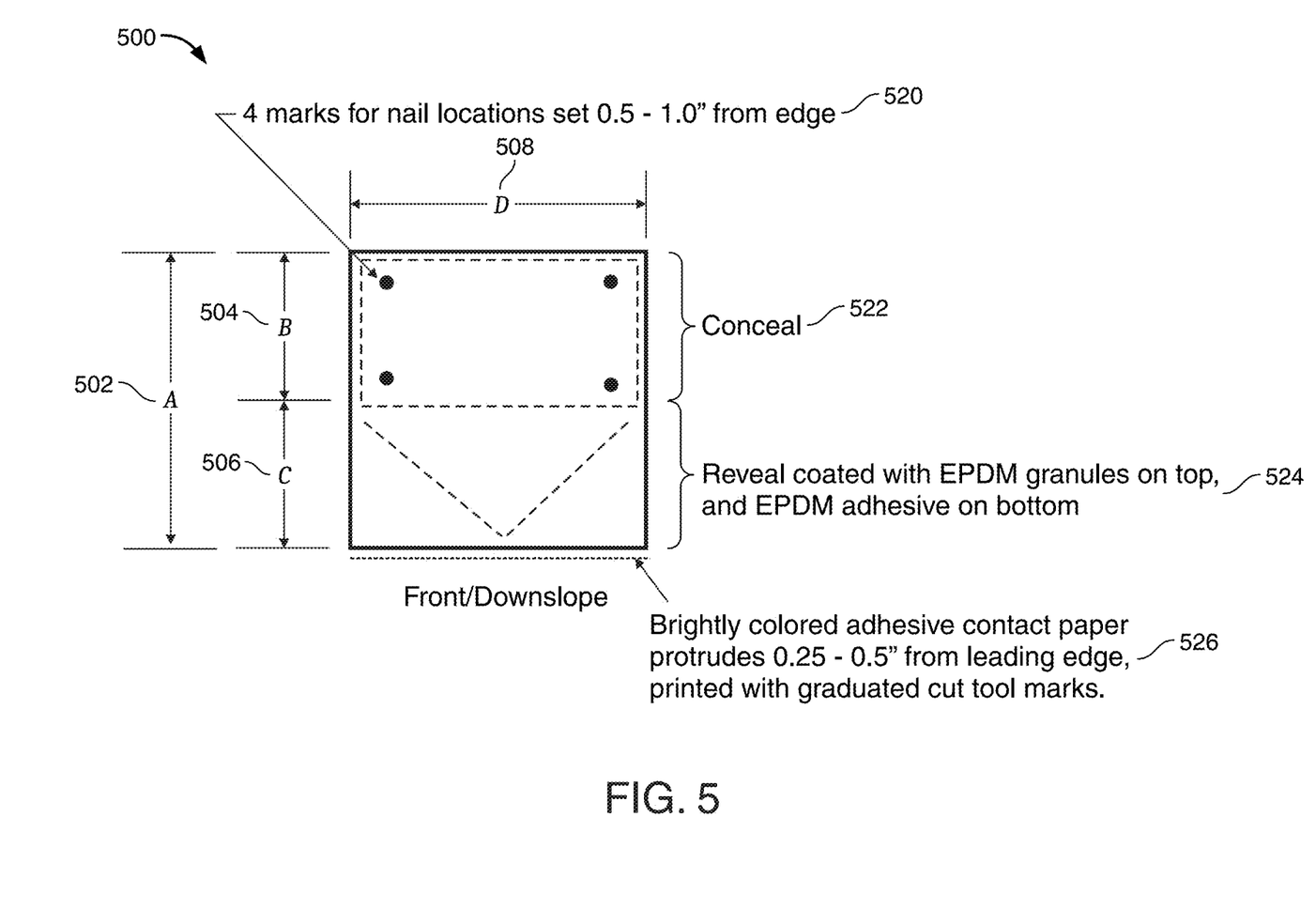
FIG. 5 shows an illustrative diagram of another roof shingle in accordance with the disclosure.

FIG. 5 shows roof shingle 500. Roof shingle 500 may be a ridge shingle. Roof shingle 500 may be hip shingle. Roof shingle 500 may be a hip/ridge shingle.

Roof shingle 500 may include a vertical height (A) 502. Vertical height (A) 502 may be about 12.0 inches. Vertical height (A) 502 may be divided into a vertical height (B) 504 and vertical height (C) 506. Vertical height (B) 504 may be about 6.0 inches. Vertical height (C) 506 may be about 6.0 inches.

Roof shingle 500 may include a horizontal length (D) 508. The horizontal length (D) 508 of roof shingle 500 may be about 12.0 inches.

Roof shingle 500 may include four marks 520 configured to indicate nail locations. The marks may each be set 0.5-1.0 inch from an edge of the shingle.

Roof shingle 500 may include conceal 522 corresponding in location and vertical height to (B) 504. Roof shingle 500 may include reveal 524 corresponding in location and vertical height to (C) 506. Reveal 524 may be coated with EPDM granules on a top, outward-facing surface. Reveal 524 may include an EPDM adhesive on a bottom, substrate-facing surface.

Roof shingle 500 may include a reinforcement core within conceal 522. Roof shingle 500 may be printed with graduated tool cut marks configured to facilitate fold reveal 524.

Roof shingle 500 may include adhesive protrusion tab 526. Adhesive protrusion tab 526 may include an adhesive contact paper. Adhesive protrusion tab 526 may protrude 0.25-0.5 inch from a leading edge of roof shingle 500. Adhesive protrusion tab 526 may be brightly colored for visibility. Adhesive protrusion tab 526 may be printed with graduated tool cut marks. Adhesive protrusion tab 526 may be included on the downslope portion of roof shingle 500. Adhesive protrusion tab 526 may be included on a substrate-facing surface (an undersurface) of reveal 524. Adhesive protrusion tab 526 may protrude from beneath reveal 524.

Variations of up to about +10% of values, dimensions or ranges presented herein are within the scope of the disclosure.

Thus, EPDM roof shingles and methods of production thereof are provided. Persons skilled in the art may appreciate that the present invention can be practiced by other than the described embodiments, which are presented for purposes of illustration rather than of limitation. The present invention is limited only by the claims that follow.

What is claimed is:

1. A roof shingle comprising:
   a polymer blend, the polymer blend comprising ethylene-propylene-diene terpolymer ("EPDM") and a thermoplastic polymer, the polymer blend comprising an outward-facing surface and a substrate-facing surface, the outward-facing surface comprising a reveal and a conceal, the reveal being visible when the roof shingle is installed and the conceal being covered by an upslope adjacent roof shingle when the roof shingle is installed;
   a reinforcement core, the reinforcement core embedded within the polymer blend;
   an adhesive sealant, the adhesive sealant applied to the substrate-facing surface for binding the roof shingle to a downslope adjacent roof shingle or a substrate; and
   a plurality of polymer blend granules, the plurality of polymer blend granules being located on at least a portion of a surface of the reveal;
   wherein:
   the polymer blend being injection-molded above and below the reinforcement core; and
   the plurality of polymer blend granules being injection-molded to form at least a portion of the surface of the reveal;
   wherein the polymer blend comprises a thermoplastic vulcanizate ("TPV").

2. The roof shingle of claim 1 wherein the reinforcement core comprises galvanized steel, and the plurality of polymer blend granules comprises granules in sizes ranging from about 0.5-2.5 mm in diameter.

3. The roof shingle of claim 1 further comprising marks configured for locations of nails, the marks being located on the conceal.

4. The roof shingle of claim 3 wherein the marks configured for locations of nails comprise 6 marks and are spaced about 5-7 inches apart from one another.

5. The roof shingle of claim 1 wherein the adhesive sealant is located up to about 0.5 inch from a leading edge of the roof shingle into the reveal, the leading edge of the roof shingle forming one edge of the reveal.

6. The roof shingle of claim 1 wherein the reinforcement core is about 0.01-0.05 inch thick in depth (Z) and runs about 35-40 inches along a horizontal length (X) of the roof shingle and the reinforcement core comprises a rigid core deployed about 0.1 inch-0.5 inch from an edge of the roof shingle.

7. The roof shingle of claim 1 wherein the surface of the reveal comprises geometric tabs, the geometric tabs configured to alternate with geometric tabs of both the upslope adjacent roof shingle and the downslope adjacent roof shingle.

8. The roof shingle of claim 7 wherein each of the geometric tabs is about 4-5 inches in horizontal length (X).

9. The roof shingle of claim 1 wherein the reveal of the roof shingle is about 5-7 inches in vertical height (Y).

10. The roof shingle of claim 1 wherein the roof shingle is operable for use on a steep-slope roof, the steep-slope roof having a pitch of greater than or equal to 2:12, where 2:12 corresponds to 2 inches of vertical rise for every 12 inches of horizontal span of the steep-slope roof.

11. The roof shingle of claim 1 wherein the roof shingle further comprises an adhesive protrusion tab, the adhesive protrusion tab protruding from a leading edge of the reveal and preventing the adhesive sealant from adhering to other materials until removal of the adhesive protrusion tab.

12. A method of producing a roof shingle, the method comprising:
    injection-molding a polymer blend, the polymer blend comprising ethylene-propylene-diene terpolymer ("EPDM") and a thermoplastic polymer, above and below a reinforcement core, the reinforcement core embedded within the polymer blend, the polymer blend comprising an outward-facing surface and a substrate-facing surface, the outward-facing surface comprising a reveal and a conceal, the reveal being visible when the roof shingle is installed, and the conceal being covered by an upslope adjacent roof shingle when the roof shingle is installed;
    injection-molding a plurality of polymer blend granules to form at least a portion of a surface of the reveal; and
    applying an adhesive sealant to the substrate-facing surface for binding the roof shingle to a downslope adjacent roof shingle or a substrate;
    wherein the polymer blend comprises a thermoplastic vulcanizate ("TPV").

13. The method of claim 12 wherein the reinforcement core comprises galvanized steel, and the plurality of polymer blend granules comprises granules in sizes ranging from about 0.5-2.5 mm in diameter.

14. The method of claim 13, the method further comprising etching marks configured for locations of nails, the marks being located on the conceal.

15. The method of claim 14 wherein the marks configured for locations of nails comprise 6 marks and are spaced about 5-7 inches apart from one another.

16. The method of claim 12, the method further comprising sealing the adhesive sealant, and wherein the adhesive sealant is located up to about 0.5 inch from a leading edge of the roof shingle into the reveal, the leading edge of the roof shingle forming one edge of the reveal.

17. The method of claim 12 wherein the reinforcement core is about 0.01-0.05 inch thick in depth (Z) and runs about 35-40 inches along a horizontal length (X) of the roof shingle and the reinforcement core comprises a rigid core deployed about 0.1 inch-0.5 inch from an edge of the roof shingle.

18. The method of claim 12 wherein the reveal comprises geometric tabs, and the geometric tabs are configured to alternate with geometric tabs of both the upslope adjacent roof shingle and the downslope adjacent roof shingle.

19. The method of claim 18 wherein each of the geometric tabs is about 4-5 inches in horizontal length (X).

20. The method of claim 12 wherein the reveal of the roof shingle is about 5-7 inches in vertical height (Y).

21. The method of claim 12 wherein the roof shingle is operable for use on a steep-slope roof, the steep-slope roof having a pitch of greater than or equal to 2:12, where 2:12 corresponds to 2 inches of vertical rise for every 12 inches of horizontal span of the steep-slope roof.

22. The method of claim 12 further comprising applying an adhesive protrusion tab to the adhesive sealant, the adhesive protrusion tab protruding from a leading edge of the reveal and preventing the adhesive sealant from adhering to other materials until removal of the adhesive protrusion tab.

23. The roof shingle of claim 1 wherein the plurality of polymer blend granules comprises granules in sizes ranging from about 0.5-2.5 mm in diameter.

24. The roof shingle of claim 1 wherein the reinforcement core comprises a rigid core deployed about 0.1 inch-0.5 inch from an edge of the roof shingle.

25. The method of claim 12 wherein the plurality of polymer blend granules comprises granules in sizes ranging from about 0.5-2.5 mm in diameter.

26. The method of claim 12 wherein the reinforcement core comprises a rigid core deployed about 0.1 inch-0.5 inch from an edge of the roof shingle.

27. A method of producing a roof shingle, the method comprising:
    injection-molding:
        a polymer blend, the polymer blend comprising ethylene-propylene-diene terpolymer ("EPDM") and a thermoplastic polymer, above and below a reinforcement core, the reinforcement core embedded within the polymer blend, the polymer blend comprising an outward-facing surface and a substrate-facing surface, the outward-facing surface comprising a reveal and a conceal, the reveal being visible when the roof shingle is installed, and the conceal being covered by an upslope adjacent roof shingle when the roof shingle is installed; and
        a plurality of polymer blend granules to form at least a portion of a surface of the reveal; and
    applying an adhesive sealant to the substrate-facing surface for binding the roof shingle to a downslope adjacent roof shingle or a substrate;
    wherein the plurality of polymer blend granules comprises granules in sizes ranging from about 0.5-2.5 mm in diameter.

28. A roof shingle comprising:
    a polymer blend, the polymer blend comprising ethylene-propylene-diene terpolymer ("EPDM") and a thermoplastic polymer, the polymer blend comprising an outward-facing surface and a substrate-facing surface, the outward-facing surface comprising a reveal and a conceal, the reveal being visible when the roof shingle is installed and the conceal being covered by an upslope adjacent roof shingle when the roof shingle is installed;
    a reinforcement core, the reinforcement core embedded within the polymer blend;
    an adhesive sealant, the adhesive sealant applied to the substrate-facing surface for binding the roof shingle to a downslope adjacent roof shingle or a substrate; and
    a plurality of polymer blend granules, the plurality of polymer blend granules being located on at least a portion of a surface of the reveal;

wherein:
the polymer blend being injection-molded above and below the reinforcement core; and
the plurality of polymer blend granules being injection-molded to form at least a portion of the surface of the reveal;
wherein the plurality of polymer blend granules comprises granules in sizes ranging from about 0.5-2.5 mm in diameter.

* * * * *